United States Patent
Vardon et al.

(10) Patent No.: US 11,952,271 B2
(45) Date of Patent: Apr. 9, 2024

(54) PHOTO TRIGGERED COVALENT ORGANIC FRAMEWORKS AND METHODS OF USING

(71) Applicants: Alliance for Sustainable Energy, LLC, Golden, CO (US); Colorado School of Mines, Golden, CO (US)

(72) Inventors: Derek Richard Vardon, Lakewood, CO (US); Wade A. Braunecker, Boulder, CO (US); Justin Carter Johnson, Denver, CO (US); Thomas Gennett, Denver, CO (US); Rachel Elizabeth Mow, Boulder, CO (US); Kurt Michael Van Allsburg, Denver, CO (US); Gabriella Lahti, Denver, CO (US)

(73) Assignees: Alliance for Sustainable Energy, LLC, Golden, CO (US); Colorado School of Mines, Golden, CO (US)

( * ) Notice: Subject to any disclaimer, the term of this patent is extended or adjusted under 35 U.S.C. 154(b) by 169 days.

(21) Appl. No.: 17/393,961

(22) Filed: Aug. 4, 2021

(65) Prior Publication Data
US 2022/0041437 A1    Feb. 10, 2022

Related U.S. Application Data

(60) Provisional application No. 63/060,870, filed on Aug. 4, 2020.

(51) Int. Cl.
| | | |
|---|---|---|
| *C01B 3/00* | (2006.01) | |
| *C07F 1/08* | (2006.01) | |
| *B82Y 40/00* | (2011.01) | |

(52) U.S. Cl.
CPC .............. *C01B 3/0015* (2013.01); *C07F 1/08* (2013.01); *B82Y 40/00* (2013.01)

(58) Field of Classification Search
None
See application file for complete search history.

(56) References Cited

PUBLICATIONS

Braunecker et al. ACS Materials Lett., 2020, 2, 227-232 (Year: 2020).*
Zhao et al. Chemical Engineering Science, 2019, 195, 801-809 (Year: 2019).*
Zuo et al. ACS Applied Materials & Interfaces, 2019, 11, 39201-39208 (Year: 2019).*
Braunecker et al., "Phenyl/Perfluorophenyl Stacking Interactions Enhance StructuralOrder in Two-Dimensional Covalent Organic Frameworks", Crystal Growth & Design, 2018, vol. 18, pp. 4160-4166.
Braunecker et al., "Thermal Activation of a Copper-LoadedCovalent Organic Framework for Near-Ambient Temperature Hydrogen Storage and Delivery", ACS Materials Letters, 2020, vol. 2, pp. 227-232.
Bruggink et al., "Concepts of Nature in Organic Synthesis: Cascade Catalysis and Multistep Conversions in Concert", Organic Process Research & Development, 2003, vol. 7, pp. 622-640.
Das et al., "Azobenzene-Equipped Covalent Organic Framework: Light-Operated Reservoir", Journal of the American Chemical Society, 2019, vol. 141, pp. 19078-19087.
Fang et al., "3D Microporous Base-Functionalized Covalent Organic Frameworks for Size-Selective Catalysis", Angewandte Chemie International Edition, 2014, vol. 53, pp. 2878-2882.
Feng et al., "Covalent organic frameworks", Chemical Society Reviews, 2012, vol. 41, pp. 6010-6022.
Hughes et al., "Covalently Bound Nitroxyl Radicals in an Organic Framework", Journal of Physical Chemistry Letters, 2016, vol. 7, No. 18, pp. 3660-3665.
Jacoby, "Covalent organic frameworks debuted and multiplied quickly", Chemical & Engineering News, Dec. 2017, p. 44.
Park et al., "Reversible Alteration of CO2 Adsorption upon Photochemical or Thermal Treatment in a Metal-Organic Framework", Journal of the American Chemical Society, 2012, vol. 134, pp. 99-102.
Denysenko et al., "Scorpionate-Type Coordination in MFU-4l Metal-Organic Frameworks: Small-Molecule Binding and Activation upon the Thermally Activated Formation of Open Metal Sites", Angew Chem Int Ed, 2014, vol. 53, pp. 5832-5836.

* cited by examiner

*Primary Examiner* — Yun Qian
(74) *Attorney, Agent, or Firm* — Neal S. Vickery; Michael A. Mcintyre

(57) ABSTRACT

Described herein are compositions and methods for the storage and release of hydrogen gas using covalent organic frameworks (COFs). Advantageously, the compositions and methods described herein may be used for the facile and rapid release of hydrogen gas at near ambient temperatures. The described COFs allow for photoactivation, where the release of gas is initiated or the rate of release is increased with the COF is exposed to electromagnetic radiation, for example, UV light.

11 Claims, 11 Drawing Sheets

PHOTO TRIGGERED COVALENT ORGANIC FRAMEWORKS AND METHODS OF USING

CROSS-REFERENCE TO RELATED APPLICATIONS

This application claims priority from U.S. Provisional Patent Application No. 63/060,870 filed on Aug. 4, 2020, the contents of which are incorporated herein by reference in its entirety.

CONTRACTUAL ORIGIN

This invention was made with government support under Contract No. DE-AC36-08GO28308 awarded by the Department of Energy. The government has certain rights in the invention.

BACKGROUND

One of the main issues with transporting hydrogen is the amount of energy required to compress hydrogen gas into liquid form and the high-pressure tanks required to safely contain compressed hydrogen are typically extremely heavy. As an alternative to storing hydrogen in liquid form, both metal organic frameworks (MOFs) and covalent organic frameworks (COFs) have been suggested as sorbents because they form exceptionally strong bonds with hydrogen. The use of MOFs and COFs may be able to reduce the pressure required to store hydrogen by nearly an order of magnitude, for example, from 700 bar to 100 bar.

However, a primary challenge with the implementation of these sorbent materials is that they typically require cryogenic temperatures to adsorb hydrogen through weak Van der Waals type interactions, which is impractical for many applications. Additionally, metal hydride based materials typically require a large amount of thermal energy (generally above 200° C.) to desorb the stored hydrogen.

It can be seen from the foregoing that there remains a need in the art for new materials that are capable of storing and desorbing hydrogen at near ambient temperatures in order to rapidly deliver hydrogen for various hydrogen fuel applications.

SUMMARY

Described herein are compositions and methods for the storage and release of hydrogen gas using covalent organic frameworks (COFs). Advantageously, the compositions and methods described herein may be used for the facile and rapid release of hydrogen gas at near ambient temperatures. The described COFs allow for photoactivation, where the release of gas is initiated or the rate of release is increased with the COF is exposed to electromagnetic radiation, for example, UV light.

In an aspect, provided is composition comprising a covalent organic framework (COF) comprising a plurality of Cu(I) moieties, wherein the COF desorbs hydrogen gas when exposed to light.

The COF may be defined by the structure:

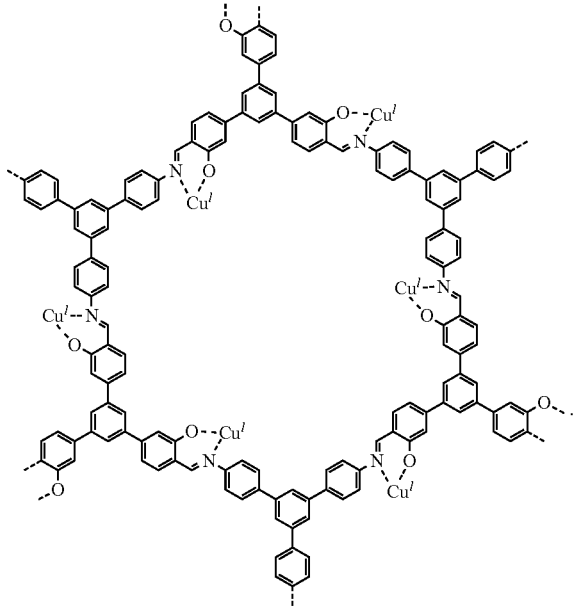

[Formula 1]

The COF may define a pore. The light may be in the visible or UV spectrum, for example, selected from the range of 10 nm to 400 nm.

The composition may further comprise a fluid, wherein the COF and the fluid form a colloidal solution where the COF is stably suspended in the fluid. The use of a colloidal solution may allow for greater or more rapid exposure of the COF to light, allowing for an increase in the rate of hydrogen release. The COF may be present in the solution in the form of nanoparticles, e.g., particles having an average diameter less than or equal to 1μm, less than or equal to 500 nm, less than or equal to 100 nm, or optionally, less than or equal to 10 nm. The fluid may comprise at least one of an ionic liquid or a liquid polymer, for example, siloxane. The COF may further comprise a capping group, for example, an aldehyde functionalized tetrakis(3,5-bis(trifluoromethyl)phenyl)borate)-based ionic liquid compound.

In an aspect, provided is a composition comprising a covalent organic framework (COF) comprising a plurality of Pd moieties, wherein the COF desorbs hydrogen gas when exposed to light. The COF may be defined by the structure provided in formula 1, wherein the Cu(I) sites are replaced with Pd.

In an aspect, provided is a method comprising: 1) providing a covalent organic framework (COF) comprising a plurality of Cu(I) moieties, with $H_2$ adsorbed on the COF; and exposing the COF to light, thereby desorbing at least a portion of the $H_2$ as a gas. The COF may be defined by the structure provided in Formula 1.

The step of exposing the COF to light may be at a temperature greater than or equal to 0° C., for example, a temperature selected from the range of 50° C. to 125° C.

In an aspect, provided is a method for catalyzing a reaction using any of the compositions described herein. In an aspect, provided is a method for catalyzing formic acid to produce hydrogen using any of the compositions described herein.

In some embodiments, additional gases such as ethylene and/or carbon monoxide may be adsorbed onto the COF, either as a replacement for $H_2$ or in addition to $H_2$.

BRIEF DESCRIPTION OF DRAWINGS

Some embodiments are illustrated in referenced figures of the drawings. It is intended that the embodiments and figures disclosed herein are to be considered illustrative rather than limiting.

(FIG. 4A) three-dimensional 'COF-301'. (FIG. 4B) two dimensional 'DHaTAB' COF. (FIG. 4C) two dimensional 'UCBZ-5'COF.

DETAILED DESCRIPTION

Figure 1:
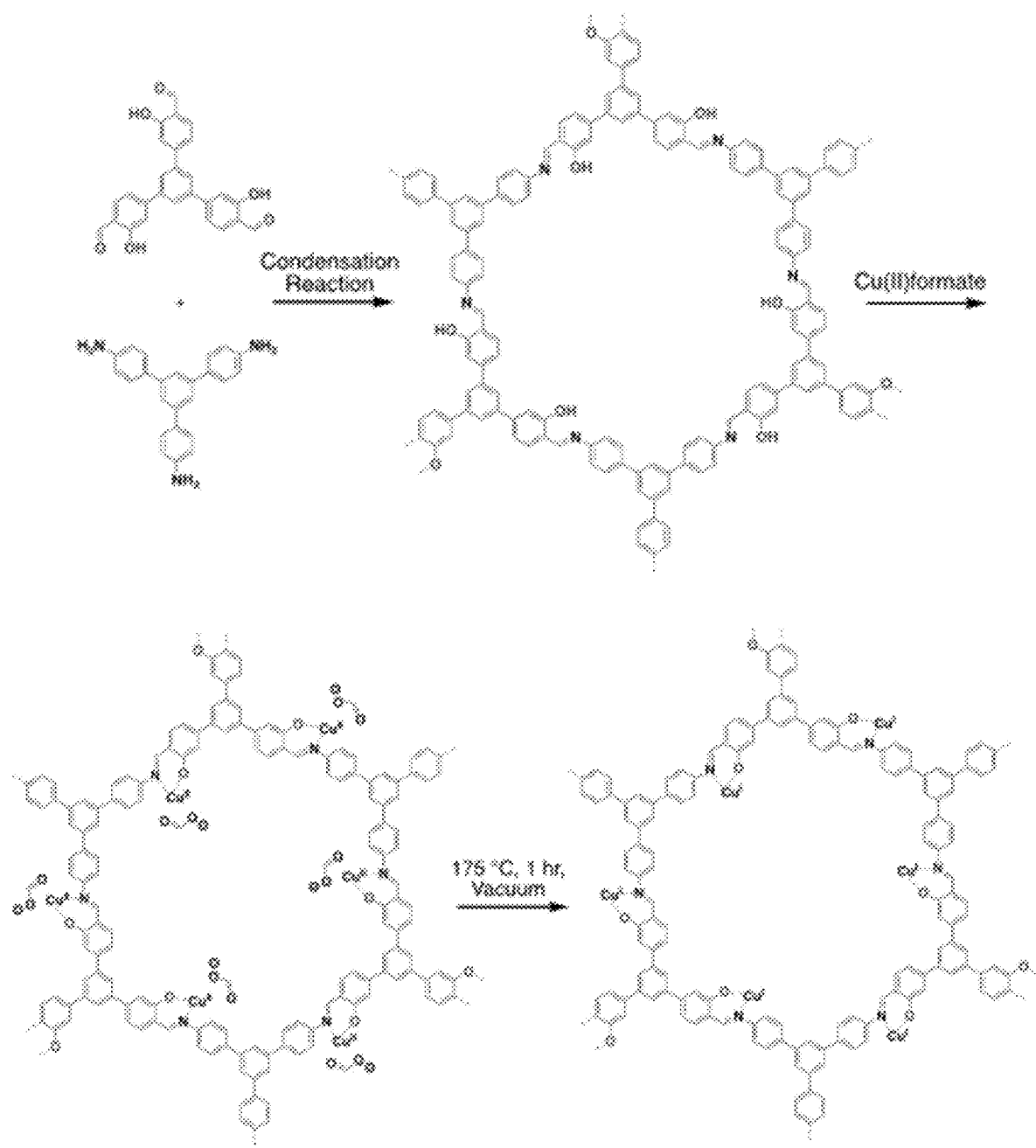
FIG. 1 illustrates Cu(I) COF synthesis: Synthesis of 2D COF, loading the COF with Cu(II)Formate, and a thermal/vacuum treatment to generate an open Cu(I) binding site.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Recent advancements in covalent organic frameworks (COFs) have the potential to alter the conventional catalyst paradigm and provide "nature inspired" control over transport and reactivity. COFs are comprised of organically linked, periodic molecular structures. The plethora of building blocks and functionalities from which COFs can be designed make these materials ideally suited for tuning porosity and embedded active sites. As shown herein, the ability to incorporate photoactive linkers into the backbone of COFs can provide ON/OFF gated hydrogen ($H_2$) storage via cis,trans-isomerization with UV light that restricts the framework pore diameter. This gating behavior may also be used to gate dynamic catalytic domains within the framework. Similar to biological systems, this offers unprecedented control over interfacial transport by dynamically tuning COF dimensions. Thus, as described herein, the present disclosure relates to, among other things: 1) gated COFs for hydrogen storage and light-activated hydrogen release; 2) use of these COFs in colloidal systems; 3) catalytic reactions using COFs; and 4) photo-enhanced formic acid decomposition using COFs.

In general for gas storage and delivery using COFs, the present disclosure relates to a strategy for gas storage and "on-demand" light activated release utilizing unique metal binding site chemistry provided by COFs in combination with the use of unique colloidal suspensions of the COFs. As shown herein, light may be applied to desorb hydrogen gas from a copper-containing COF at temperatures lower than those required for thermal desorption. Further, the unique Cu(I) metal binding oxidation state provided by the COF framework may be switched "on" and "off" with light to trigger desorption events. In addition, to address the barriers to efficient delivery of light to heterogenous gas adsorption materials, a solution is described herein that utilizes a colloidal solution of stable, nanometer-sized COFs that can be indefinitely suspended and directed past a light source in thin films. This offers the potential for greatly improving COF metal active site photo-adsorption efficiency to trigger gas release. Finally, additional design considerations are provided herein for the use of size-excluded solvents to suspend and circulate the COF while keeping the COF pores open and available for gas sorption, using so-called 'porous liquid' sorbents.

In general, for catalytic applications using COFS, novel COFS containing both tailored Cu(I) sites and photo-enhanced chemistry are described herein. First, the ability of using Cu(I)-containing COFs to catalyze an azide-alkyne cycloaddition reaction is demonstrated herein, having commercial relevance for biological and/or pharmaceutical chemical production. Stable and isolated Cu(I) sites are difficult to achieve with conventional heterogenous catalysts and the approaches described herein demonstrate the ability to transport larger molecules to tailored COF active sites for catalytic chemistry. Further, by switching the COF from copper-containing to palladium-containing, it is shown herein that one can significantly increase the reaction rate for formic acid decomposition with light to selectivity produce hydrogen in aqueous solutions at room temperature. The photo-rate enhancement is unique to a Pd-containing COF that utilizes a DhaTab support when compared to control experiments with Pd supported on activated carbon, as well as other COF supports. When paired with the novel colloidal synthesis approach described above to suspend COFs in solution, this work conceptually provides a promising path towards addressing the barriers of efficient light delivery and room temperature catalysis with aqueous formic acid as an energy carrier and in situ reducing agent for process chemistry.

Gas storage/delivery—Photoinduced desorption of $H_2$ form Cu(I)-loaded COF: Most framework-based $H_2$ sorbents require cryogenic temperatures to adsorb $H_2$ (−196° C.) through weak physisorption processes. Cu(I)-loaded COF materials with highly engineered copper binding sites can desorb $H_2$ at temperature between 100° C. and 150° C. Further, as shown herein, the application of UV light to Cu(I)-loaded COF materials can desorb $H_2$ from the copper at substantially lower temperatures (e.g. at about 0° C.) than would be otherwise possible using traditional thermal desorption techniques.

There is a concept in organometallic chemistry known as π-backbonding whereby certain "π-accepting" ligands and/or gas molecules will bind strongly with certain electron rich metals in a particular oxidation state. For this reason, π-accepting gasses such as carbon monoxide, ethylene, and/or acetylene may form strong, stable complexes at ambient temperatures/pressures with Cu(I) species (capable of π-backbonding), but in its +2 oxidation state, the analogous Cu(II) species has a significantly reduced capacity to π-backbond, and thus Cu(II) species generally do not form stable complexes with these gasses at ambient temperatures/pressures. $H_2$ gas is capable of acting as a "π-accepting" ligand and may bind to Cu(I) in copper-loaded frameworks (although no examples of Cu(I)-$H_2$ complexes in solution are known because almost all solvents bind more strongly to Cu than $H_2$ binds to Cu). The $H_2$ desorption observed in the presence of UV light may occur due to some function of a "metal-to-ligand" charge transfer. The results shown herein provide a path forward for efficient, dynamic and reversible tuning of the metal oxidation state, and hence, a route to effectively "tune" $H_2$ binding enthalpies.

Colloidal COFs for Enhanced Light Penetration: Because frameworks absorb a substantial amount of UV and visible light, the light generally only penetrates several hundred nanometers to a few microns deep into a framework support; thus, when used as a photocatalyst support, the bulk of the support and catalyst are not efficiently illuminated. COF colloids are sensitive to their environment and using incumbent technology it was not possible to load colloidal COFs with a metal photocatalyst and/or metal site for gas sorption without destabilizing/destroying the COFs in the process. According to some embodiments of the present disclosure, a novel method was developed for functionalizing and stabilizing COF colloids that allows them to be indefinitely suspended and circulated past a light source. This method makes it possible to load COF colloids with a metal photocatalyst. This technique paves the way for greatly enhancing the efficiency of photo-assisted gas desorption events, as well as photocatalytic reactions in COFs.

Figure 4A:
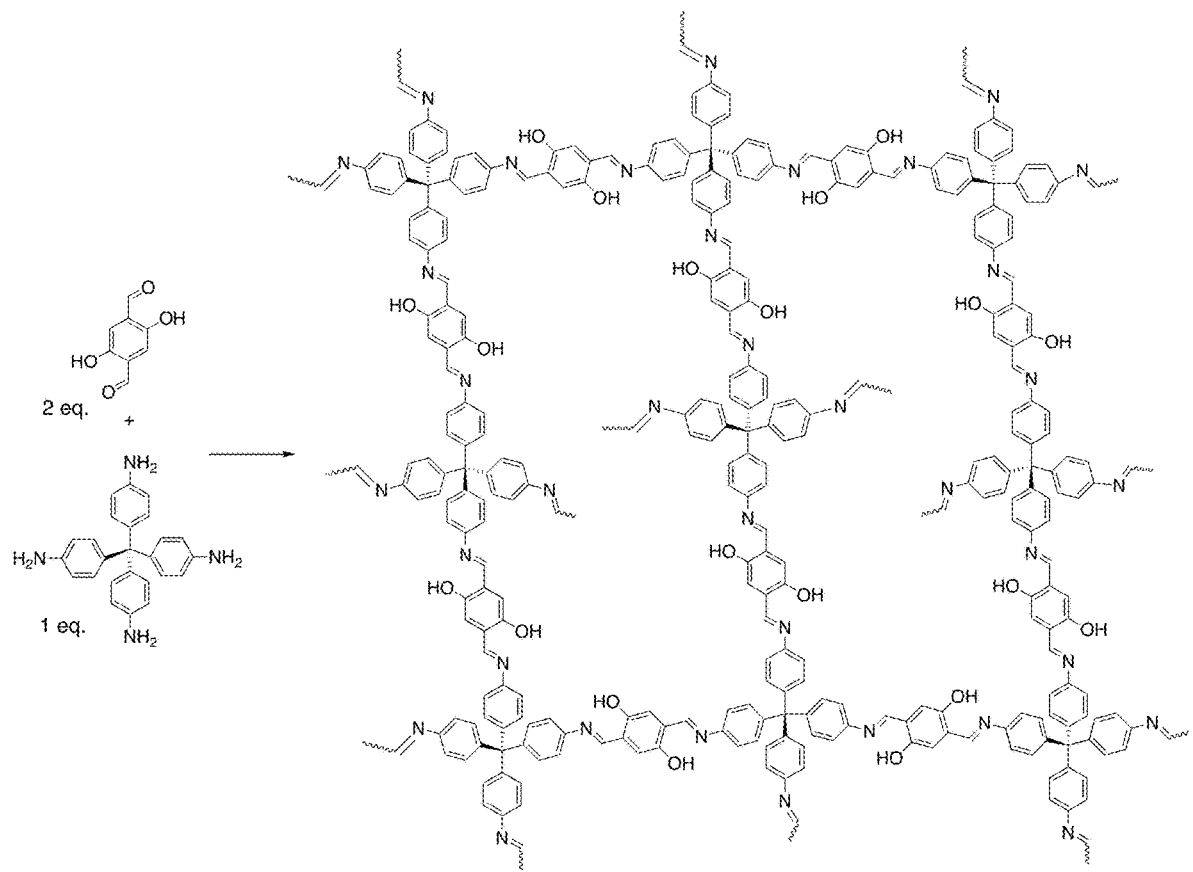
FIGS. 4A-4C provide COFs with phenol-imine binding sites for which we have applied our Cu loading and thermal treatment process and demonstrated that $H_2$ desorption occurs above room temperature.
Figure 4B:
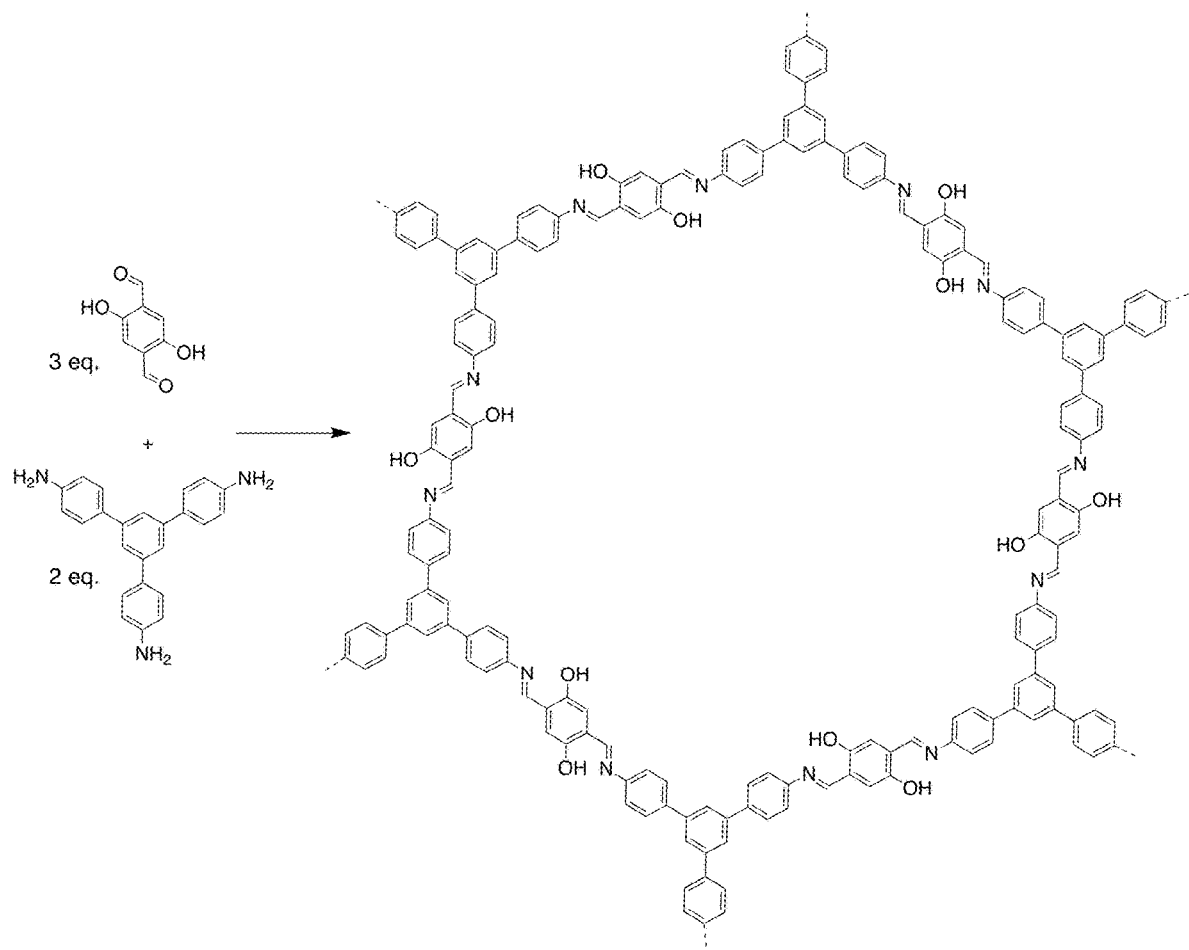
Figure 4C:
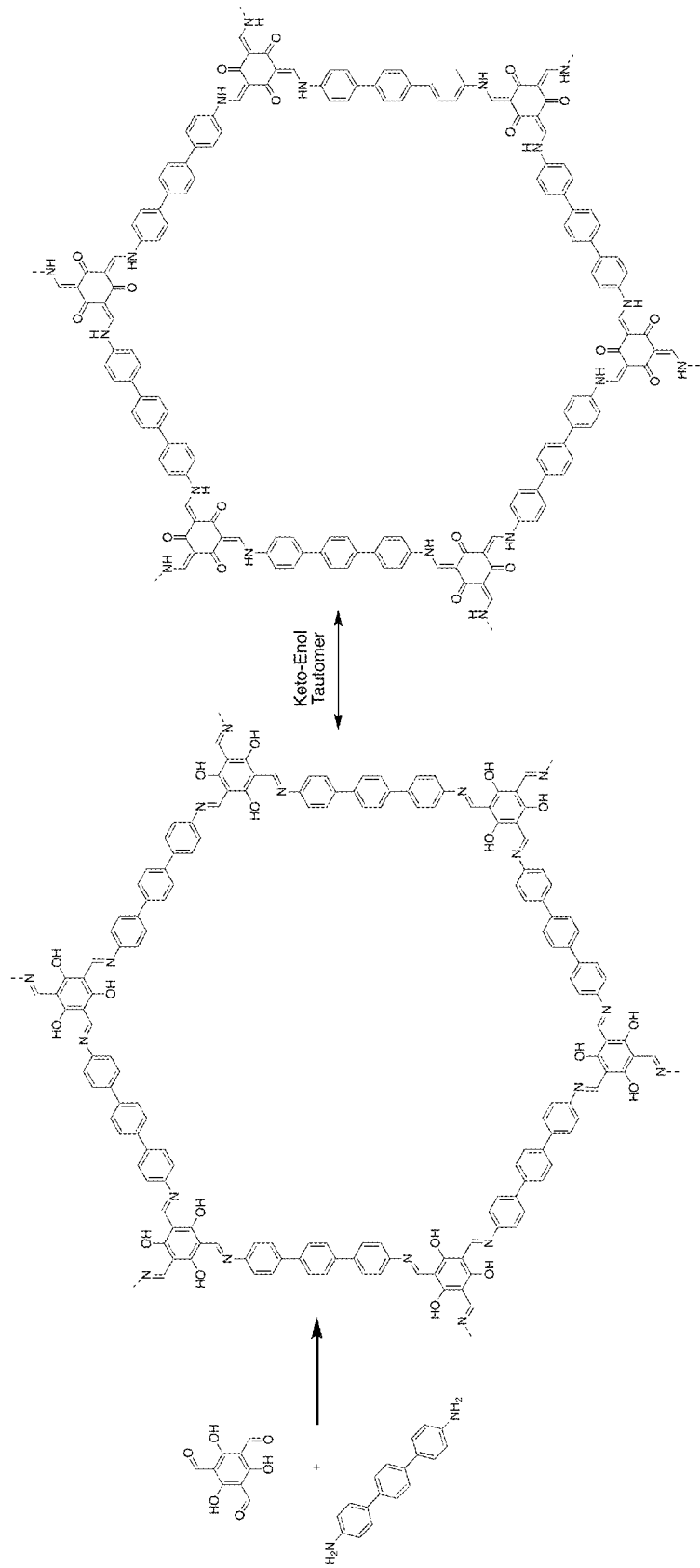
Figure 5:
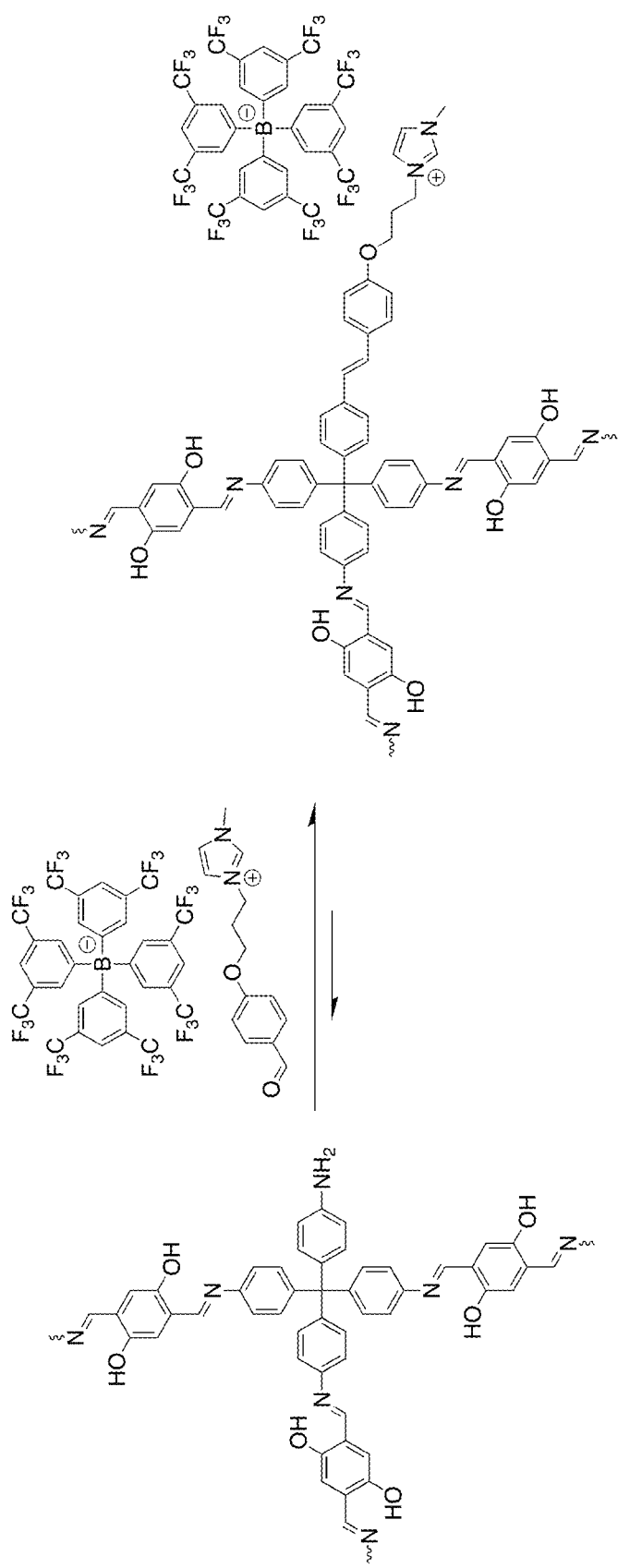
FIG. 5 illustrates functionalization of pendent, unreacted amines at the surface of a COF-301 particle with an aldehyde functionalized BArF-based ionic liquid compound.

In some embodiments of the present disclosure, imine-based COFs may be constructed by reacting aldehyde and amine-based linkers through a condensation reaction (see FIG. 4A). Pendent unreacted amine and aldehyde groups are typically present at the periphery of every COF particle. If these particles come in close contact, they tend to permanently aggregate through the formation of a covalent imine bond. The key to stabilizing COF colloids towards this aggregation was finding the right sized "capping" agent to effectively coat the colloids without destabilizing them in the process.

"Small" capping agents were determined to penetrate the COF, react throughout the material, and effectively clog the pores/alter the chemical makeup. Large, polymeric capping agents entangled multiple COF colloids and precipitated them. After numerous designs/iterations of capping agents, a capping agent was identified that was excluded by size from the interior of the COF but would not entangle multiple particles. Using this capping agent, the COF "shell" was successfully coated/stabilized, after which the colloid was precipitated, resuspended, used in a wide variety of organic solvents/reaction conditions, and even loaded with metal catalysts, all without inducing colloid-destroying aggregation that typically occurs with incumbent materials. Dynamic light scattering data confirms the synthesis of stable Cu-loaded COF colloids <350 nm in diameter. These results represent a practical advance for the development of stable, nanometer sized framework supports that can be loaded with metal photocatalysts/gas sorption sites and then efficiently illuminated.

Photo-induced desorption of $H_2$ from colloidal COF-based "Porous Liquids: By suspending a framework in a size-excluded solvent, a COF can be effectively given the property of a fluid as a so-called "porous liquid". Because the size-excluded solvents cannot enter the pores of the COF, the framework pores remain available for gas sorption. By effectively combining the strategies outlined above, and combining the Cu(I)-loaded COF for photo-assisted $H_2$ desorption and presenting it in colloidal form by suspending it in a bulky ionic liquid or liquid polymer, the colloidal Cu(I)-loaded COF may be circulated and re-circulated past a light source for efficient desorption of hydrogen gas at ambient temperature.

Preliminary data show the feasibility of synthesizing COF colloids, functionalizing them and then loading them with a copper complex designed for efficient hydrogen sorption. The colloids remained less than about 350 nm in diameter after loading with copper, and could be suspended in a variety of solvents, including two different bulky size-excluded liquids, e.g. a room temperature bulky ionic liquid, and a star-shaped liquid polymer based on poly(dimethylsiloxane). By these experiments, it was confirmed that porous liquids can be made from these materials where the supporting solvent does not enter the COF colloid pores, allowing the COFs to be circulated/stirred by a light source, while maintaining open pores for gas sorption.

Catalytic "click reaction" with Cu(I)-COF: To initially demonstrate the ability of COFs to provide a tailored metal site and facilitate solution-phase reactant transport for catalytic applications, several Cu(I)-containing COFs were then tested for the catalytic azide-alkyne cycloaddition (CuAAC). CuAAC is a so-called "click reaction" used for highly selective cross-linking of diverse chemical groups with extremely mild and tolerant reaction conditions. Click reactions are frequently used in biological environments and other delicate settings where most chemical transformations would not be possible.

The COFs tested include the 2D Cu(I)-COF used above for gas adsorption, as well as another known as DhaTab. Both catalysts were found to be active for the CuAAC reaction, as shown in Scheme 1 below, with yields of 80% for 2D Cu(I)-COF and 96% for Cu(I)-DhaTab after 23 hours of reaction at room temperature. The reaction in Scheme 1 can be generalized to Scheme 2, which depicts the CuAAC reaction with an arbitrary alkyne having organic backbone R and an arbitrary azide having organic backbone R'.

Scheme 1. Test CuAAC reaction using the Cu(I)-COF catalysts.

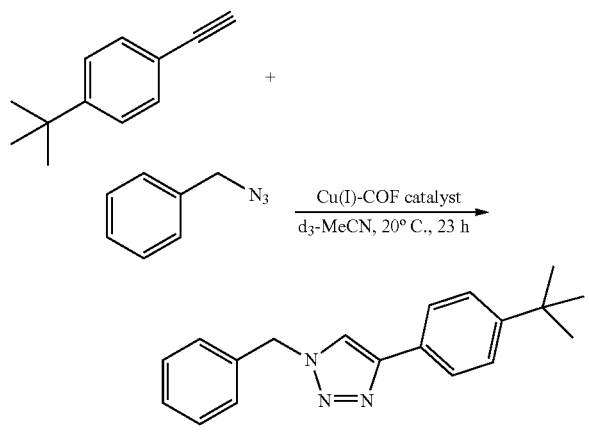

80-96%

Scheme 2.
Generalized CuAAC reaction between an alkyne and azide catalyzed by the Cu(I)-COFs.

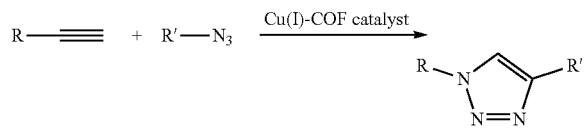

Most CuAAC reactions are performed using a soluble Cu(II) source and a reductant that converts the Cu(II) into the active Cu(I) catalyst because Cu(I) complexes are readily oxidized to Cu(II) when exposed to air. The COFs employed herein appeared to stabilize the otherwise short-lived Cu(I) oxidation state. Furthermore, CuAAC catalysis by COFs may be useful in applications that are incompatible with soluble Cu(I), require a solid-state catalyst and/or one with size selectivity, and/or would use the solid-state catalyst to control the reaction and subsequent separation steps. Furthermore, the Cu(I)-COFs described herein may be more active than other framework materials, which require elevated temperature to achieve similar conversions to those reported herein, which reacted at room temperature and in the absence of stirring the COF catalysts.

Photo-enhanced formic acid decomposition with Pd-DhaTab COF: Formic acid decomposition (FAD) with metal loaded COFs was then evaluated in detail due to the relevance of this reaction for storage, transport, and on-demand retrieval of both energy and hydrogen. Formic acid may be prepared from hydrogen and carbon dioxide via various well-established routes, or directly from the electroreduction of carbon dioxide in water. Because formic acid is a liquid at room temperature, it has storage and transport advantages over storing compressed or liquefied hydrogen. Formic acid may be converted back to hydrogen and carbon dioxide via FAD, which also has a competing undesired reaction that produces carbon monoxide and water. The hydrogen produced from FAD can be combusted in an engine or fuel cell to yield electricity, used directly in industrial processes, or integrated into catalytic process chemistry as an in situ hydrogen donor. For industrial and/or remote applications specifically, beneficial attributes of a formic acid decomposition process could include on-demand hydrogen generation, use of intermittent and/or renewable electricity, and/or selectivity for hydrogen with minimal CO formed. The approach described herein offers many possible benefits, including: i) using renewable energy to drive the light source, and thus the reaction, at lower temperatures ii) having activity, and therefore hydrogen generation, that can be rapidly turned on and off by switching on/off the light source in contrast to slow-responding thermal reactors, iii) possibly eliminating all resistive heating from the process in favor of light providing the driving force, iv) process safety and intensification benefits relating to the same, v) high selectivity to the desired product with minimal CO formation, and vi) tunable activity owing to the molecularly defined catalyst architectures offered by COFs.

Figure 9:
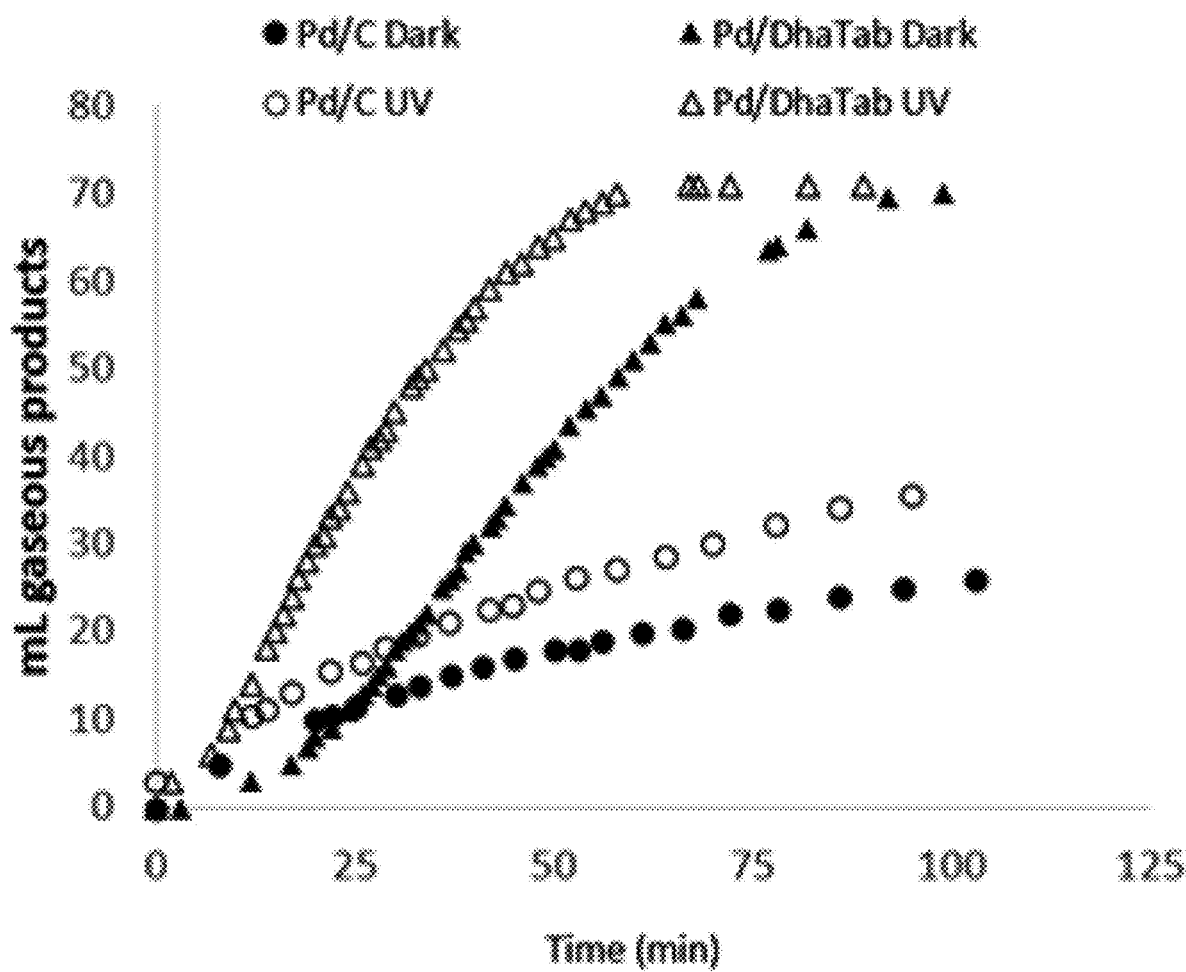
FIG. 9 illustrates experimental data showing the 365-nm UV light-driven increase in reaction rate for Pd/DhaTab-catalyzed FAD, which is larger than the light-driven increase in rate for a commercial Pd/C catalyst, according to some embodiments of the present disclosure. Experiments performed with 10 mg catalyst, 35 mg HCOONa, 57 μL HCOOH, and 1 mL deionized water in a 10 mL round-bottom flask immersed in a water bath controlled at 25° C.

Pd-DhaTab catalyst was tested for FAD activity at temperatures ranging from room temperature to about 100° C. When the catalyst was illuminated with a 365-nm UV light source, while immersed in a temperature-controlled bath, the FAD reaction rate increased relative to that of the same catalyst not exposed to light (see FIG. 9). The light-driven increase in rate was also larger than that for a Pd/C control catalyst, when normalized to accessible palladium metal surface sites by chemisorption, as shown in Table 1. In this testing, significant formation of carbon monoxide was not observed, the primary undesired side product, when measuring the gas composition produced from FAD.

TABLE 1

Material properties and rates of FAD with and without UV exposure. Corresponding reaction conditions and rate data shown in FIG. 9, with turn over frequency based on the extent of conversion after 30 min of reaction.

| Catalyst Material | Surface Area ($m^2\ g^{-1}$) | Pd Dispersion (%) | Dark Formic Acid TOF ($h^{-1}$) | UV Formic Acid TOF ($h^{-1}$) | UV Rate Increase |
|---|---|---|---|---|---|
| 5% Pd/AC | 750 | 9 | 559 | 731 | 1.3 |
| 25% Pd-DhaTab | 907 | 27 | 273 | 946 | 3.5 |

Materials and Methods:

Preparation of Cu-loaded COF. The 2D COF[16] and 3D COF[17] used in these studies were prepared according to general literature procedures. The COFs were loaded with Cu(II) formate by stirring 100 mg of the dried COF with 100 mg of Cu(II) formate tetrahydrate in 100 mL of reagent grade methanol for 24 h at 60° C. The Cu-COF was then filtered, stirred over 50 mL methanol at room temperature for 3 h and filtered again twice, and dried under ~100 mTorr vacuum for 48 h at 40° C.; higher temperatures risk partially reducing Cu(II) to Cu(I). The orange/brown COF turned darker brown upon addition of the Cu. Cu content was quantified using inductively coupled plasma-atomic emission spectrometry (ICP-AES) and estimated at ~13% by weight, corresponding to slightly more than 70% of theoretical phenoxy imine sites (theoretical 18 wt %).

Synthesis of 3-(3-(4-formylphenoxy)propyl)-1-methyl-1H-imidazol-3-ium tetrakis(3,5-bis(trifluoro-methyl)phenyl) borate). 4.18 g of 1-methylimidazole (51 mmol) and 10.114 g of 4-(2-chloroethoxy)benzaldehyde (55 mmol) were dissolved in 85 mL dry acetonitrile and reacted at 100° C. for 48 hours. The reaction was cooled to room temperature, and the solvent was removed with a rotary evaporator. The solid material was dissolved in DI water and washed with ethyl acetate three times. The product was dried under vacuum at 100° C. and used without further purification. 3.0684 g (3.5 mmol) of Na BArF was dissolved in 40 mL chloroform and stirred at 50° C. for 1 hour to dissolve. The imidazolium chloride intermediate was dissolved in 30 mL chloroform and then mixed with the Na BArF solution. The reaction was stirred at 40° C. for 24 h, during which time NaCl precipitated from solution. NaCl was filtered from the solution, and the product was purified with flash chromatagraphy in dichloromethane. The compound was characterized with 1H NMR, 13C NMR, and FTIR. 1H NMR (400 MHz, DMSO-d6): d 9.87 (s, 1H), 9.15 (s, 1H), 7.85 (d, 2H, J =9.2 Hz), 7.81 (s, 1H), 7.71 (s, 1H), 7.66 (s, 4H), 7.62 (s, 8H), 7.08 (d, 2H, J =8.8 Hz), 4.37 (t, 2H, J =7.0 Hz), 4.16 (t, 2H, J =5.8 Hz), 3.85 (s, 3H), 2.32 (m, 2H). 13C NMR (100 MHz, DMSO-d6): d 191.2, 163.1, 161.7, 161.2, 160.7, 160.2, 136.8, 134.0, 131.7, 129.8, 128.6, 128.3, 128.0, 125.3, 123.6, 122.6, 122.4, 117.5, 114.8, 65.1, 46.3, 35.7, 28.8.

Colloidal COF synthesis. Colloidal COFs were synthesized by dissolving 80.6 mg (0.21 mmol) of tetrakis(4-aminophenyl)methane and 59.3 mg (0.44 mmol) of terephthalaldehyde in 40 mL dry acetonitrile. The solution was sparged with nitrogen. 10 mL of trifluoroacetic acid was added to 10 mL of dry acetonitrile and sparged with nitrogen, after which it was added to the monomer solution. The reaction was stirred at the desired temperature for 72 h, after which time it was cooled to 60° C. and was hot filtered with a 10-micron filter before dynamic light scattering measurements. Purification of the colloids involved centrifugation at 14,000 rpm for 10 min, followed by decantation of the supernatent acetonitrile. The colloids were resuspended in acetonitrile through 5 min. of ultrasonication.

COF functionalization. The COF shell was functionalized by tethering the aldehyde functionalized BArF compound to unreacted amines at the COF surface. 50 mg of 3-(3-(4-formylphenoxy)propyl)-1-methyl-1H-imidazol-3-ium BArF and 50 mg of purified colloidal COF were dissolved/suspended in acetonitrile and reacted at 90° C. for 24 h. The functionalized COF was purified with repeated centrifugation in acetonitrile to ensure all unreacted BArF salt was removed. FTIR was used to confirm successful functionalization by identifying C-F and imidazolium stretches at 1150 cm$^{-1}$ and 680 cm$^{-1}$, respectively, that were not present in the parent COF.

Porous liquid synthesis. Porous liquids were synthesized by mixing the colloidal COF suspension in acetonitrile with the BArF ionic liquid. Following 5 min of ultrasonication, acetonitrile was removed with a rotary evaporator. The porous liquids were dried under vacuum on a Schlenk line at 100 mTorr at 90° C. for 48 h.

Pd-metalated DhaTab COF. DhaTab was prepared by Schiff base reaction of 2,5-dihydroxyterephthalaladehyde (Dha) and 1,3,5-tris(4-aminophenyl)benzene (Tab), as previously described.[9] The DhaTab COF was metalated with Pd by stirring DhaTab with palladium(II) nitrate hydrate in methanol for 24 h at room temperature to achieve a Pd weight loading of 25%.

Copper(I)-catalyzed azide-alkyne cycloaddition. In an NMR tube fitted with a sealed cap, 4-tert-butylphenylacetylene (90.2 µL, 0.5 mmol), benzyl azide (62.5 µL, 0.5 mmol), 5 mg of either Cu(I)-DhaTab or 2D Cu(I)-COF, and $d_3$-acetonitrile (0.7 mL) were combined and mixed by manually inverting the tube several times. The reaction was followed by $^1$H NMR spectroscopy (400 MHz). After 23 h of reaction at 20° C. without stirring, the observed yields of 1-benzyl-4-[p-(tert-butyl)phenyl]-1H-1,2,3-triazole were 0.04% for a blank (no catalyst), 80% for 2D Cu(I)-COF, and 96% for Cu(I)-DhaTab.

Formic acid decomposition. A procedure adapted from Gu et al.[15] was used for batch formic acid decomposition experiments. The catalysts used were 25% Pd/DhaTab, prepared as described above, and 5% Pd supported on powdered activated carbon (5% Pd/C), purchased from Sigma Aldrich. In a 10 mL round-bottom flask equipped with a stir bar, formic acid (57 µL), sodium formate (35 mg), deionized water (1.0 mL), and 10 mg catalyst were combined. The addition of formic acid to the mixture defined t=0. As soon as the formic acid and water were added the flask was rapidly sealed (within 30 seconds) with a rubber septum. Within 30 seconds of placing the rubber septum, the septum was pierced with a cannula, the other end of which had previously been inserted into an inverted graduated cylinder full of water and immersed in a water bath. The quantity of gas evolved into the graduated cylinder was observed and recorded throughout the experiment. The flask was then placed in a temperature-controlled bath within 1 minute after the start of the experiment. For photocatalytic experiments, this was a water bath at 25° C.; for higher temperature thermal experiments up to 100° C., an oil bath was used. In experiments that included UV light delivery, a Thorlabs M365L2 365 nm LED driven by an appropriate driver (LEDD1B or DC2200) at its maximum power setting was placed approximately 1 cm from the flask and switched on no later than 1 minute after the start of the experiment. In experiments conducted "in the dark," aluminum foil was used to exclude stray light from the reaction flask. At the end of the measurement, a long needle was used to extract the evolved gases from the graduated cylinders and these gases were analyzed on a gas chromatograph with thermal conductivity detector.

EXAMPLE 1

Cu(I) Loaded Frameworks

An important factor for improving the binding enthalpy of hydrogen gas to allow adsorption above cryogenic temperatures is introducing open metal binding sites. These sites must be truly open, not merely the result of a non-coordinating ion in the organometallic polymerization catalyst, as most other materials (solvents, etc.) will bind to an open metal site ahead of hydrogen. Additionally, material properties play a key factor as the pressure and/or temperature changes required to desorb moisture from a metal site are often enough to collapse the metal framework.

Figure 3:
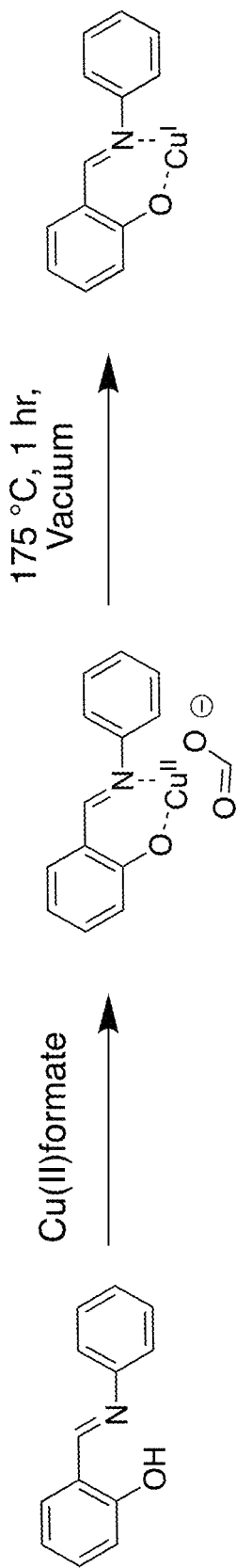
FIG. 3 illustrates the phenol-imine binding site required to bind Cu as described herein.
Figure 8:
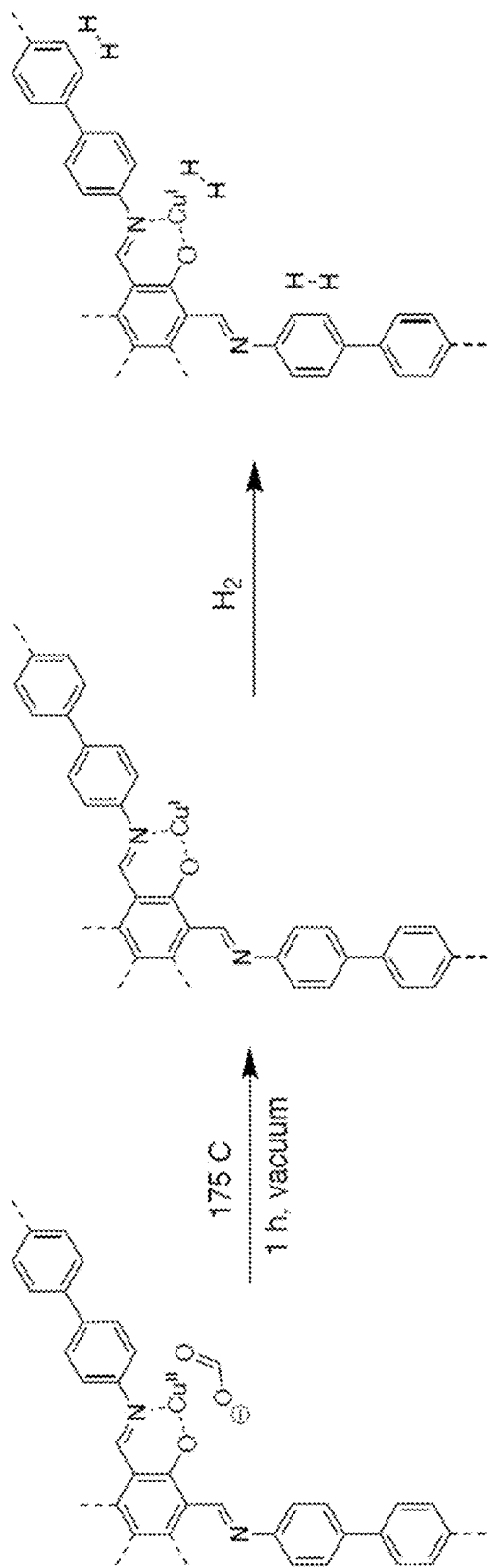
FIG. 8 illustrates heat treatment of a Cu(II) formate-loaded COF to generate open Cu(I) binding sites for $H_2$ adsorption, according to some embodiments of the present disclosure.

As illustrated in FIG. 1, the present application is directed towards a COF with metal docking sites in the backbone. The COF is loaded with Cu(II) formate and the Cu binds to various sites within the framework. Formate also serves as a reducing agent. By heating the Cu loaded COF in a vacuum (e.g., at 175° C.), the Cu(II) sites are reduced to Cu(I) and the formate is converted to $CO_2$ and is pumped away, resulting in an open site for $H_2$ binding. This reaction is illustrated in FIGS. 3 and 8.

Figure 2:
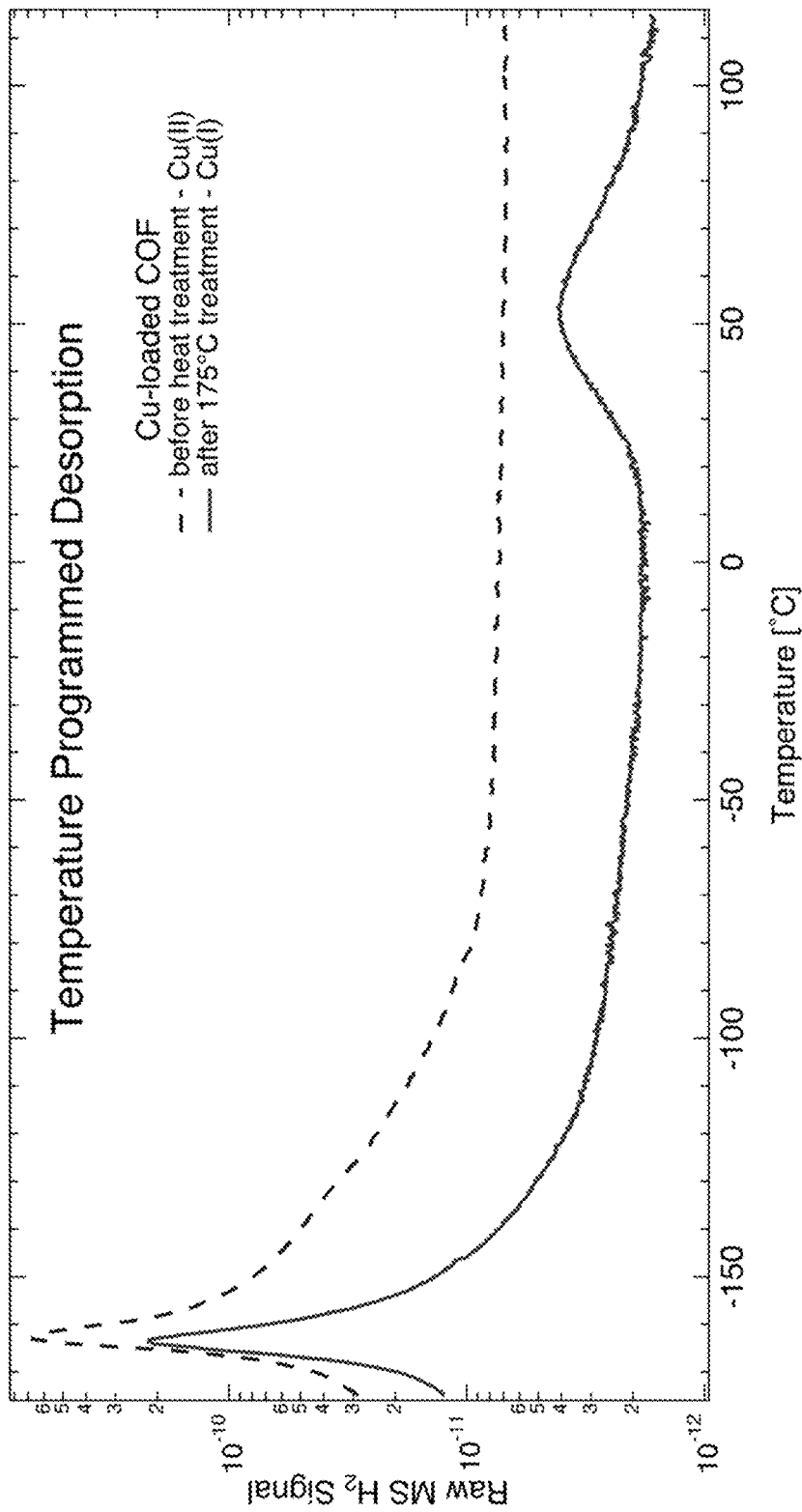
FIG. 2 provides temperature programmed desorption (TPD) analysis of NREL Cu-COF from FIG. 1, loaded with $H_2$, before and after thermal/vacuum treatment to generate open binding site for $H_2$.

Temperature programmed desorption data (TPD) is provided in FIG. 2, comparing a Cu(II) formate loaded COF and a Cu(I) COF. The materials were loaded with hydrogen gas, quenched with liquid nitrogen and exposed to vacuum while increasing the temperature while monitoring the $H_2$ desorption using mass spectrometry. In both samples a desorption peak can be seen at −160° C. but a second desorption peak can be seen in the Cu(I) COF at approximately 50° C. A variety of COFs have been synthesized and the secondary desorption peak ban be tuned to temperatures between 50-125° C., which are near to ambient temperatures.

Figure 6:
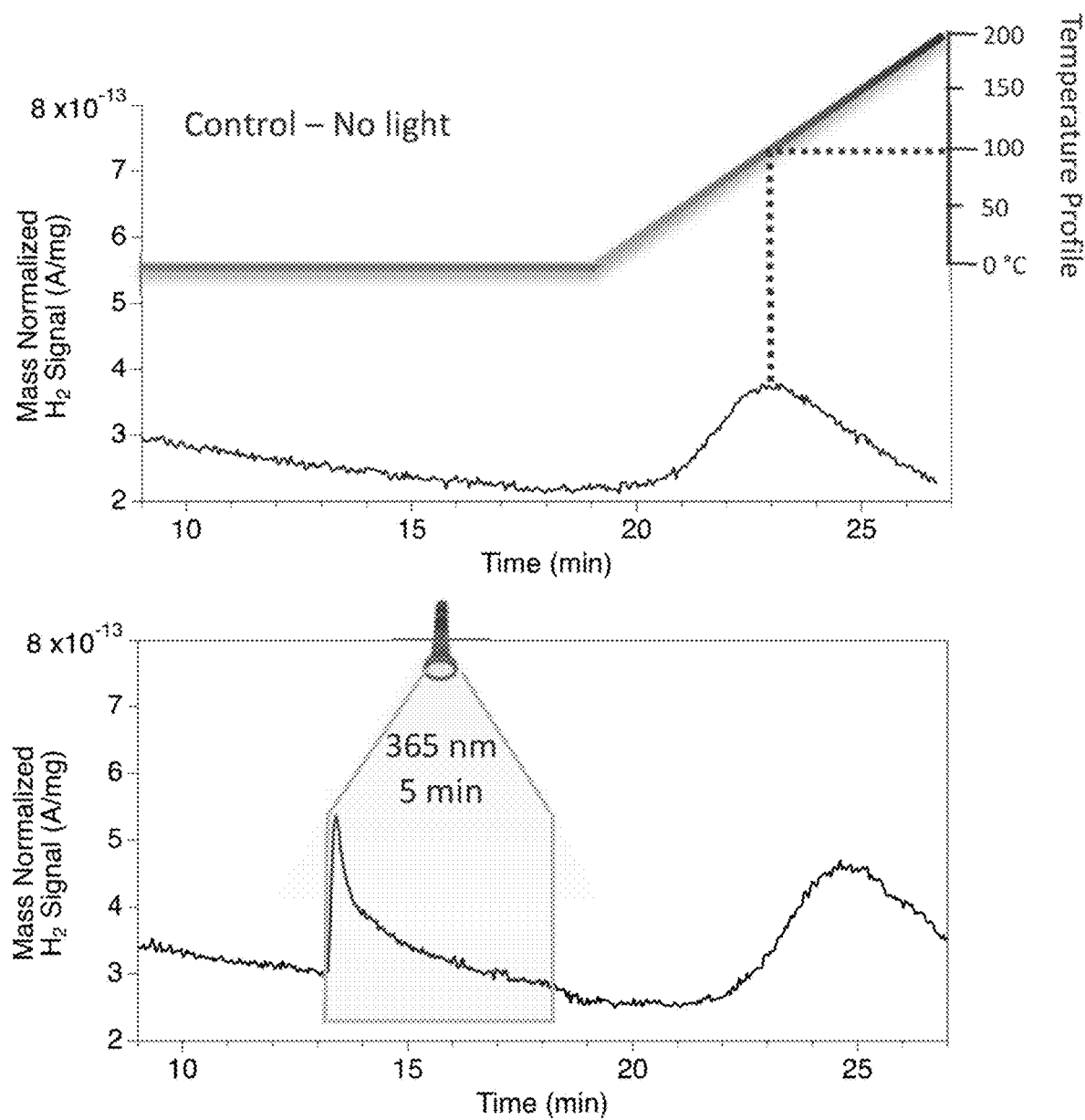
FIG. 6 illustrates TPD of $H_2$ loaded Cu(I)-COF-301 (Top). No $H_2$ is desorbed when the sample is held in an ice bath at 0° C. $H_2$ desorption peaks near 100° C. as the temperature is ramped. While $H_2$ loaded Cu(I)-COF-301 is held in an ice bath, the application of UV light for 5 minutes desorbs a significant fraction of adsorbed $H_2$ (Bottom).
Figure 7:
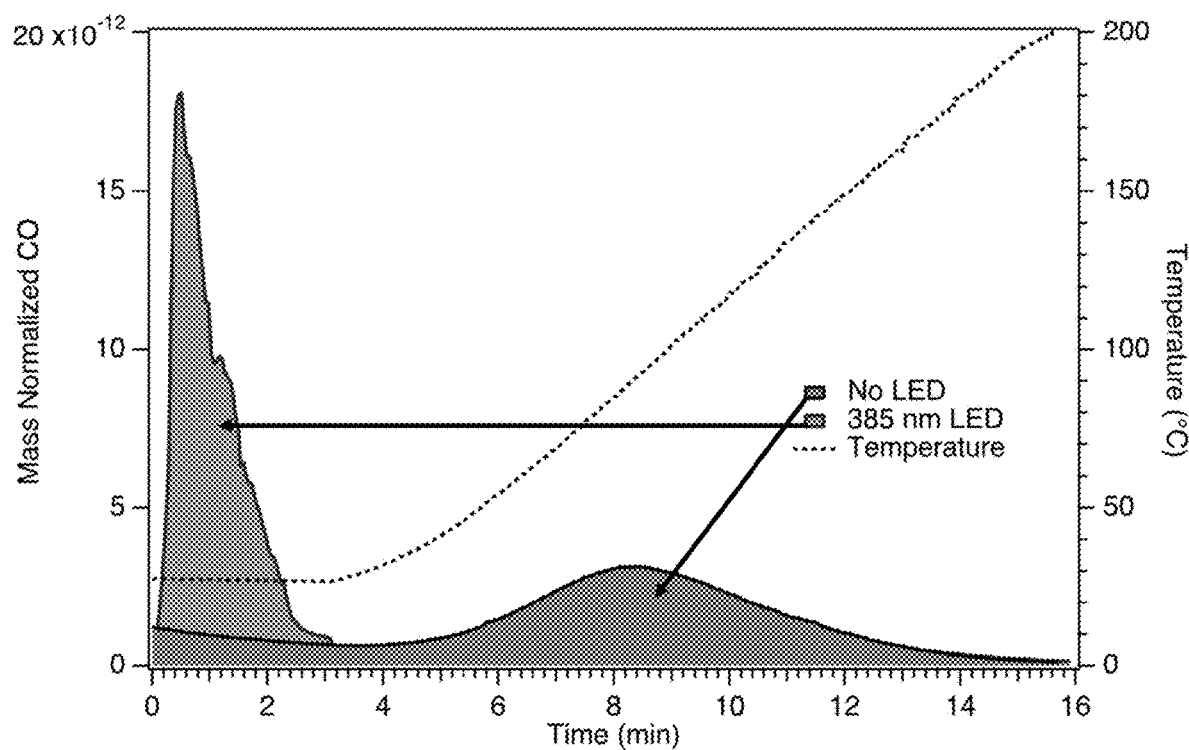
FIG. 7 illustrates TPD of carbon monoxide loaded Cu(I)-COF-301. No CO is desorbed when the sample is held in a room temperature bath. CO desorption peaks near 100° C. as the temperature is ramped. While CO loaded Cu(I)-COF-301 is held at room temperature, the application of UV light for 3 minutes desorbs virtually all of the adsorbed CO.

Additionally, photoisomerizable moieties (e.g., azobenzene) may be engineered into the COF framework, allowing light to isomerize the moiety and disrupting hydrogen binding at the Cu site. Temperature programmed desorption (TPD) data utilizing this concept is provided in FIG. 6. The photoisomerizable COFs were reduced to 0° C. using an ice bath and heated to 200° C. at a rate of 15° C/min. One sample was run in the dark (no light exposure) while the second sample was exposed to a low intensity 365 nm LED for 5 minutes. While the COF material was no exposed to light (top), no $H_2$ is released at ° C.; however, the sample exposed to light instantly began to release $H_2$. Interesting, even samples that did not include the photoisomerizable moieties also showed $H_2$ desorption when exposed to light.

It has been recently demonstrated that Cu(I) complexes with carbon monoxide and acetylene, which formed otherwise stable complexes with Cu(I) solution, would undergo reversible photo-induced dissociation in solution. Here, it is demonstrated that light induces a reversible metal-to-ligand charge transfer that results in the formation of a short-lived Cu(II) species with significantly reduced capacity for pi-back bonding to these molecules when compared to the more electron rich d10 Cu(I) metal. In the presence of light, the gas molecules desorb from the complexes and when the light is turned off, the metal species revert to Cu(I) and the complexes reform. $H_2$ gas is capable for acting as a "π-accepting" and will bind to Cu(I) is the described Cu-loaded COFs, allowing for the tuning of $H_2$ binding enthalpies allowing from $H_2$ desorption at temperatures 100° C. lower than otherwise possible and allow for rapid desorption on demand utilizing light.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A composition comprising:
a covalent organic framework (COF) comprising a plurality of Cu(I) moieties,
wherein the COF desorbs hydrogen gas when exposed to light; and
wherein the COF is defined by the structure:

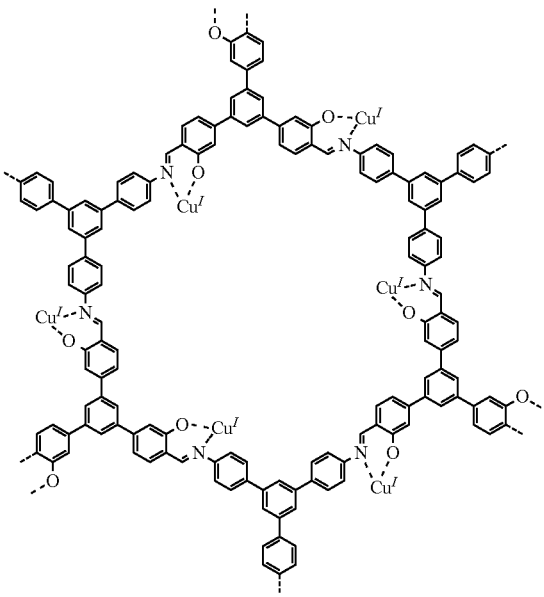

2. The composition of claim 1, wherein the COF further comprises a capping group.

3. The composition of claim 2, wherein the capping group comprises an aldehyde functionalized tetrakis(3,5-bis(trifluoromethyl)phenyl) borate) ionic liquid compound.

4. The composition of claim 1, wherein the COF defines a pore.

5. The composition of claim 1, wherein the light is in the UV spectrum selected from the range of 10 nm to 400 nm.

6. The composition of claim 1, further comprising a fluid, wherein: the COF and the fluid form a colloidal solution where the COF is stably suspended in the fluid.

7. The composition of claim 6, wherein the COF is present in the form of nanoparticles.

8. The composition of claim 6, wherein the fluid comprises at least one of an ionic liquid or a liquid polymer.

9. The composition of claim 8, wherein the liquid polymer comprises a siloxane.

10. The composition of claim 1, wherein the COF also desorbs ethylene when exposed to light.

11. The composition of claim 1, wherein the COF also desorbs carbon monoxide when exposed to light.

* * * * *